(12) United States Patent
Araki et al.

(10) Patent No.: US 9,255,609 B2
(45) Date of Patent: Feb. 9, 2016

(54) TOLERANCE RING, HARD DISK DEVICE, AND METHOD FOR MANUFACTURING HARD DISK DEVICE

(71) Applicant: NHK Spring Co., Ltd., Yokohama-shi (JP)

(72) Inventors: Toshimitsu Araki, Kanagawa (JP); Norihiro Tajima, Kanagawa (JP); Mitsuteru Mimura, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 0 days.

(21) Appl. No.: 14/362,742

(22) PCT Filed: Dec. 10, 2012

(86) PCT No.: PCT/JP2012/081987
§ 371 (c)(1),
(2) Date: Jun. 4, 2014

(87) PCT Pub. No.: WO2013/085060
PCT Pub. Date: Jun. 13, 2013

(65) Prior Publication Data
US 2014/0362474 A1    Dec. 11, 2014

(30) Foreign Application Priority Data

Dec. 9, 2011 (JP) ................. 2011-270726

(51) Int. Cl.
*G11B 5/48* (2006.01)
*F16C 35/00* (2006.01)
(Continued)

(52) U.S. Cl.
CPC ............. *F16C 35/00* (2013.01); *F16C 27/02* (2013.01); *F16D 1/0835* (2013.01); *F16D 7/021* (2013.01); *F16D 7/024* (2013.01); *G11B 5/4813* (2013.01);
(Continued)

(58) Field of Classification Search
CPC ....... G11B 5/4813; F16D 7/021; F16D 7/024; F16D 1/0835
USPC .......... 360/264.1, 264.3, 264.7, 265.2, 265.4, 360/265.5, 265.6; 384/626
See application file for complete search history.

(56) References Cited

U.S. PATENT DOCUMENTS 4,981,390 A * 1/1991 Cramer et al. ............... 403/371
5,315,465 A   5/1994 Blanks
(Continued)

FOREIGN PATENT DOCUMENTS

CN    1217339 C    8/2005
CN   101529102 A   9/2009
(Continued)

OTHER PUBLICATIONS

International Search Report dated Feb. 19, 2013, issued for PCT/JP2012/081987.
(Continued)

*Primary Examiner* — Jefferson Evans
(74) *Attorney, Agent, or Firm* — Locke Lord LLP

(57) ABSTRACT

A tolerance ring has a ring shape formed of a plate-shaped member substantially into a circle along a predetermined direction and includes a plurality of convex portions protruding in a radial direction, and a notch portion notched in a direction orthogonal to a circumferential direction on at least one of outer edge side end portions in the direction orthogonal to the circumferential direction.

12 Claims, 10 Drawing Sheets

(51) Int. Cl.
*F16D 7/02* (2006.01)
*F16D 1/08* (2006.01)
*G11B 5/55* (2006.01)
*F16C 27/02* (2006.01)
*G11B 5/596* (2006.01)

(52) U.S. Cl.
CPC .............. *G11B 5/5569* (2013.01); *G11B 5/596* (2013.01); *F16C 2370/12* (2013.01); *G11B 2220/2516* (2013.01); *Y10T 29/49025* (2015.01)

(56) References Cited

U.S. PATENT DOCUMENTS

| | | | |
|---|---|---|---|
| 6,288,878 | B1 | 9/2001 | Misso et al. |
| 6,333,839 | B1 | 12/2001 | Misso et al. |
| 6,655,847 | B2 | 12/2003 | Obara et al. |
| 7,850,389 | B2 | 12/2010 | Hanrahan et al. |
| 8,385,024 | B2 * | 2/2013 | Schmidt et al. ............ 360/265.6 |
| 9,022,683 | B2 * | 5/2015 | Nias ........................ F16C 11/04 360/265.2 |
| 9,062,700 | B2 * | 6/2015 | Pennsiriwongse ...... F16B 17/00 |
| 2007/0291417 | A1 | 12/2007 | Woodhead et al. |
| 2008/0043374 | A1 * | 2/2008 | Hanrahan et al. .......... 360/265.6 |
| 2008/0049362 | A1 * | 2/2008 | Hanrahan et al. .......... 360/256.2 |
| 2010/0003076 | A1 | 1/2010 | Slayne |
| 2010/0046867 | A1 * | 2/2010 | Hosmer et al. ................ 384/276 |
| 2011/0076096 | A1 * | 3/2011 | Slayne et al. .................. 403/372 |
| 2012/0087044 | A1 * | 4/2012 | Schmidt ............... G11B 5/4813 360/265.6 |
| 2013/0105267 | A1 * | 5/2013 | Nakamura et al. ............ 192/56.1 |
| 2014/0185164 | A1 * | 7/2014 | Nias et al. ................... 360/246.8 |
| 2014/0313618 | A1 * | 10/2014 | Araki et al. .................... 360/244 |

FOREIGN PATENT DOCUMENTS

| | | |
|---|---|---|
| CN | 102124241 A | 7/2011 |
| EP | 1184583 A1 | 3/2002 |
| EP | 1898108 A2 * | 3/2008 .............. F16B 21/20 |
| JP | 05-205413 A | 8/1993 |
| JP | 2002-106554 A | 4/2002 |
| JP | 2002-130266 A | 5/2002 |
| JP | 2002-130310 A | 5/2002 |
| JP | 2003-518592 A | 6/2003 |
| JP | 2003-522912 A | 7/2003 |
| JP | 2007-305268 A | 11/2007 |
| JP | 2008-520926 A | 6/2008 |
| JP | 2012-052638 A | 3/2012 |

OTHER PUBLICATIONS

Notice of Allowance mailed on Jul. 14, 2015 issued for corresponding Japanese Patent Application No. 2013-548326.
Office Action dated Aug. 7, 2015 issued for corresponding Chinese Patent Application No. 2012 800 60681.X.

* cited by examiner

TOLERANCE RING, HARD DISK DEVICE, AND METHOD FOR MANUFACTURING HARD DISK DEVICE

FIELD

The present invention relates to a tolerance ring used for a hard disk device or the like, a hard disk device, and a method for manufacturing a hard disk device.

BACKGROUND

A hard disk device has conventionally been used in equipment that processes information such as a computer. In recent years, the hard disk device is coming to be mounted on a home appliance such as a television set or a video recorder, and automotive electronic equipment in addition to being used as an external storage device of a computer.

A conventional hard disk device 200 illustrated in FIG. 15 houses a drive mechanism in a casing body 201. The drive mechanism includes a spindle 203 that rotates and drives a hard disk 202 being a recording medium (the spindle is rotated by a motor not illustrated in the drawing), a carriage 205 that supports a magnetic head 204 to record information in the hard disk 202 and read out the information, and pivots over a surface of the hard disk 202, a VCM (Voice Coil Motor) 206 that causes the carriage 205 to pivot precisely to control the scan of the magnetic head 204, and a pivot axis 207 that is fixed to the casing body 201 and connects the casing body 201 and the carriage 205. The pivot axis 207 has, for example, a substantially columnar shape, and has the configuration of a bearing.

The carriage 205 pivots on the pivot axis 207 as a center axis over the surface of the hard disk 202. A tolerance ring is used to fix between the carriage 205 and the pivot axis 207. The carriage 205 is fixed to the pivot axis 207, which prevents the power of the VCM 206 applied for the pivoting of the carriage 205 to be transferred to the casing body 201.

The tolerance ring has a ring shape formed of a flat plate-shaped member and obtained by curving the flat plate-shaped member almost into a circle along a predetermined direction. After the tolerance ring is inserted into an opening of the carriage 205, the pivot axis 207 is pressed into the tolerance ring. As such a tolerance ring, a tolerance rings including convex contact portions protruding toward the outer periphery side are disclosed (see, for example, Patent Literature 1 to 4). The contact portions of the tolerance ring as disclosed in Patent Literatures 1 to 4 are pressed against a side surface of either the carriage 205 or the pivot axis 207 to fix between the carriage 205 and the pivot axis 207.

CITATION LIST

Patent Literature

Patent Literature 1: Japanese Laid-open Patent Publication No. 05-205413
Patent Literature 2: Japanese National Publication of international Patent Application No. 2003-522912 W
Patent Literature 3: Japanese Laid-open Patent Publication No. 2002-130310
Patent Literature 4: Japanese Laid-open Patent Publication No. 2007-305268

SUMMARY

Technical Problem

In the conventional tolerance rings as disclosed in Patent Literatures 1 to 4, for example, a tolerance ring 208 including convex portions 208a (contact portions) illustrated in FIGS. 16 and 17, if the pivot axis 207 is inserted into the tolerance ring 208 fitted in the carriage 205, the diameter of the tolerance ring 208 is expanded along the diameter of the pivot axis 207 when the pivot axis 207 approaches the positions where the convex portions 208a are formed.

At this point in time, the diameter of the tolerance ring 208 is expanded at an end on the pivot axis 207 insertion side. In reaction to this, the diameter at the other end is reduced. If such changes in the diameters occur at both ends of the tolerance ring 208, the end opposite to the insertion side floats up as illustrated in FIG. 16. If the pivot axis 207 continues being inserted from this state (see FIG. 17) and is fully inserted, an axis N1 of the carriage 205 rotates and inclines with respect to a center axis N2 of the pivot axis 207 as illustrated in FIG. 18. This influences the precision of the assembly of the drive mechanism, which is a problem.

The present invention has been made in view of the above. An object of the present invention is to provide a tolerance ring; a hard disk device, and a method for manufacturing a hard disk device, which can suppress the rotation of a carriage with respect to a pivot axis and improve the precision of the assembly.

Solution to Problem

To solve the problem described above and achieve the object, a tolerance ring according to the present invention has a ring shape formed of a plate-shaped member and obtained by curving the plate-shaped member substantially into a circle along a predetermined direction, is provided with a plurality of convex portions protruding in a radial direction, and includes a notch portion notched in a direction orthogonal to a circumferential direction on at least one of outer edge side end portions in the direction orthogonal to the circumferential direction.

Moreover, in the above-described tolerance ring according to the present invention, the notch portion is provided between the plurality of convex portions, and a length of the notch portion in the circumferential direction is equal to or less than a distance between the plurality of convex portions.

Moreover, in the above-described tolerance ring according to the present invention, the length of the notch portion in the direction orthogonal to the circumferential direction is equal to or more than a distance between the outer edge side end portion in the direction orthogonal to the circumferential direction and an end of the convex portion on the outer edge side end portion side.

Moreover, in the above-described tolerance ring according to the present invention, the notch portion is provided at a position that divides a side in the circumferential direction into equal parts.

Moreover, in the above-described tolerance ring according to the present invention, the outer edge side end portion includes one or two notch portions.

Moreover, in the above-described tolerance ring according to the present invention, the notch portion includes: an extending portion extending from a proximal end; and a distal end portion provided at an end on a different side from the proximal end side of the extending portion, the distal end portion having an arc shape with a predetermined diameter.

Moreover, in the above-described tolerance ring according to the present invention, the diameter of the distal end portion is equal to or larger than a width of the extending portion in the circumferential direction.

Moreover, in the above-described tolerance ring according to the present invention, the radius of curvature of an end in the circumferential direction is smaller than the radius of curvature of a part other than the end in the circumferential direction.

Moreover, in the above-described tolerance ring according to the present invention, the radius of curvature continuously becomes smaller from the part other than the end toward a direction of the end.

Moreover, in the above-described tolerance ring according to the present invention, the plurality of convex portions are arranged along the circumferential direction, and among the convex portions arranged along the circumferential direction, the number of the convex portions arranged in one line is a multiple of three.

Moreover, a hard disk device according to the present invention includes: a hard disk being a recording medium; a magnetic head that records information in the hard disk and reads out information; a carriage that supports the magnetic head and pivots over a surface of the hard disk; a tolerance ring that has a ring shape formed of a plate-shaped member and obtained by curving the plate-shaped member substantially into a circle along a predetermined direction, that is provided with a plurality of convex portions protruding in a radial direction, and that is housed in a hollow space formed in the carriage; and a pivot axis inserted into the ring shape of the tolerance ring, wherein the tolerance ring includes a notch portion notched in a direction orthogonal to a circumferential direction on at least one of outer edge side end portions in the direction orthogonal to the circumferential direction.

Moreover, a method for manufacturing a hard disk device according to the present invention includes: housing a tolerance ring that has a ring shape formed of a plate-shaped member and obtained by curving the plate-shaped member substantially into a circle along a predetermined direction and that is provided with a plurality of convex portions protruding in a radial direction, in a hollow space formed in a carriage that supports a magnetic head that records information in a hard disk being a recording medium and reads out information and pivots over a surface of the hard disk; and inserting a pivot axis into the ring shape of the tolerance ring, wherein the tolerance ring includes a notch portion notched in a direction orthogonal to a circumferential direction on at least one of outer edge side end portions in the direction orthogonal to the circumferential direction.

Advantageous Effects of Invention

According to the present invention, a notch portion notched in a direction orthogonal to the circumferential and thickness directions of a tolerance ring is provided; therefore, when a pivot axis is inserted into the tolerance ring and approaches convex portions, even if the diameter of the tolerance ring is expanded at an end on the pivot axis insertion side, it becomes possible to prevent an end on an opposite side to the insertion side from floating up following the expansion of the diameter, suppress the rotation of a carriage with respect to the pivot axis, and improve the precision of the assembly.

DESCRIPTION OF EMBODIMENT

Figure 1:
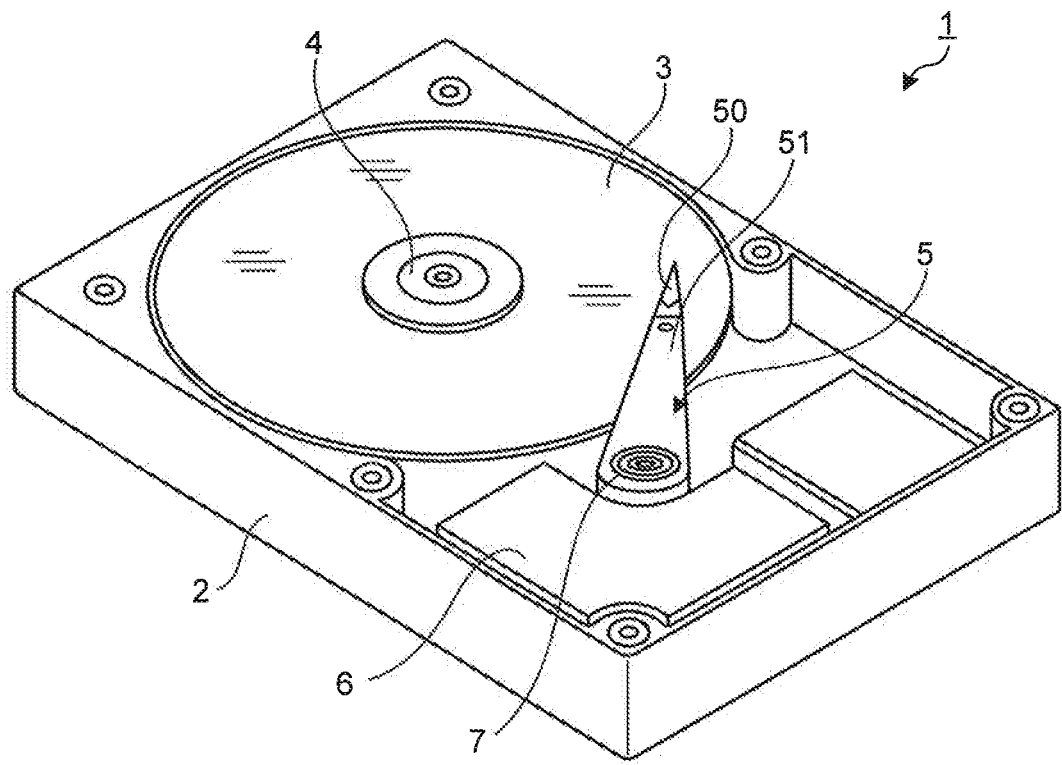
FIG. 1 is a perspective view illustrating a schematic configuration of a hard disk device according to an embodiment of the present invention.

Hereinafter, an embodiment of the present invention is described in detail with reference to the drawings. The present invention is not limited by the following embodiment. Moreover, the drawings referred to in the following description merely illustrate general shapes, sizes, and positional relationships in a degree to give an understanding of the content of the present invention. In other words, the present invention is not limited only to the shapes, sizes, and positional relationships illustrated in the drawings. A hard disk device is described as an example of a tolerance ring in the following description.

FIG. 1 is a perspective view illustrating a schematic configuration of a hard disk device according to the embodiment of the present invention. A hard disk device 1 illustrated in FIG. 1 houses a drive mechanism in a casing body 2. The drive mechanism includes a spindle 4 that rotates and drives a hard disk 3 being a recording medium, a carriage 5 that supports a magnetic head portion 50 to record information in the hard disk 3 and read out information, and pivots over a surface of the hard disk 3, a VCM 6 that causes the carriage 5 to pivot precisely to control the scan of the magnetic head portion 50, and a columnar pivot axis 7 that is fixed to the casing body 2 and connects the casing body 2 and the carriage 5. The pivot axis 7 has, for example, a substantially columnar shape, and has the configuration of a bearing.

Figure 2:
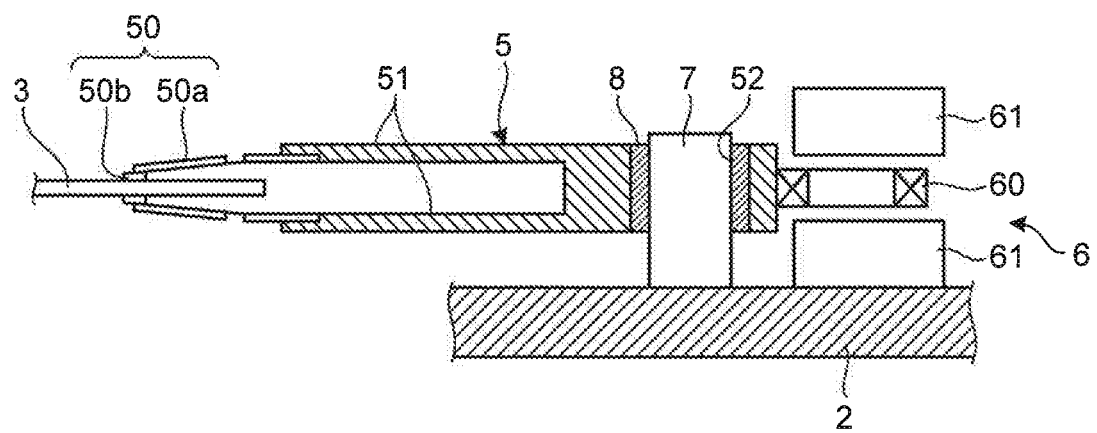
FIG. 2 is a partial sectional view illustrating the configuration of a main part of the hard disk device illustrated in FIG. 1.
Figure 3:
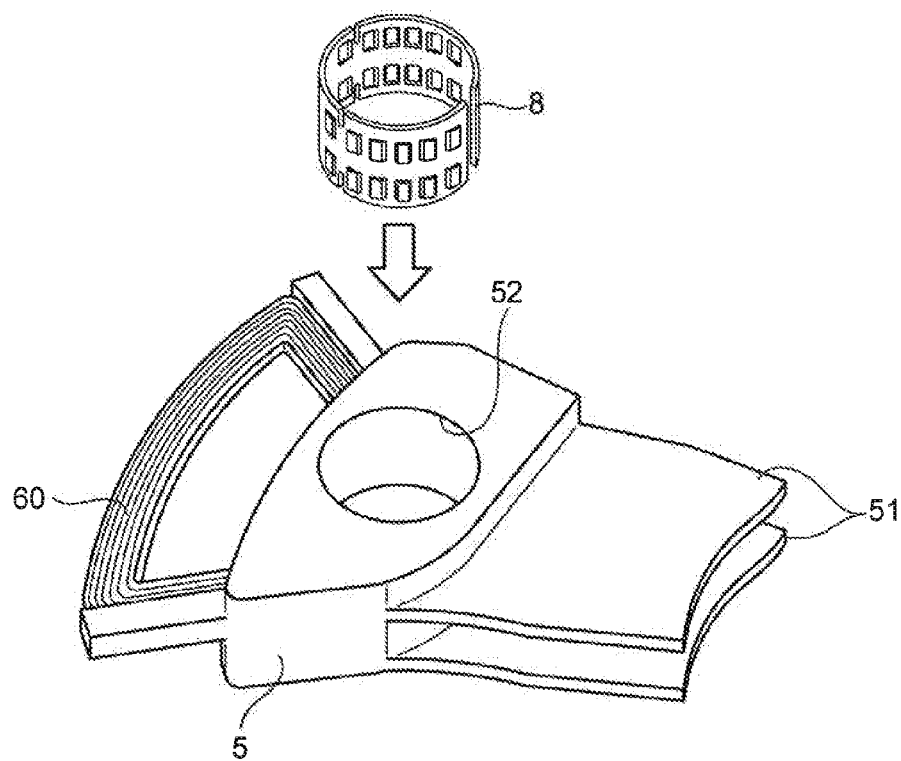
FIG. 3 is a perspective view illustrating the configuration of the main part of the hard disk device illustrated in FIG. 1.
Figure 4:
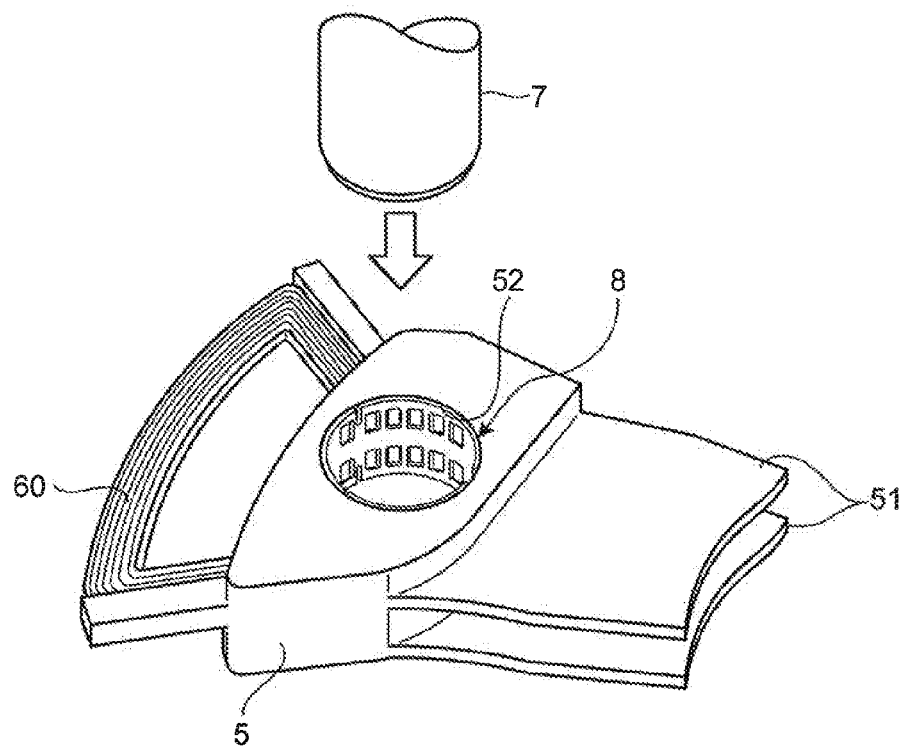
FIG. 4 is a perspective view illustrating the configuration of the main part of the hard disk device illustrated in FIG. 1.

FIG. 2 is a partial sectional view illustrating the configuration of a main part of the hard disk device 1 illustrated in FIG. 1. FIGS. 3 and 4 are perspective views illustrating the configuration of the main part of the hard disk device 1 illustrated in FIG. 1. The carriage 5 includes an arm 51 that extends above the surface of the hard disk 3, and holds the magnetic head portion 50 at its distal end, and a connection portion 52 that is connected to the pivot axis 7 and includes a columnar hollow space having a cross section with a diameter slightly larger than the diameter of a cross section of the pivot axis 7. As illustrated in FIG. 2, the magnetic head portion 50 includes a suspension 50a that floats above the surface of the hard disk 3 with an air stream produced by the rotation of the hard disk 3, and a magnetic head 50b that is provided at an end of the suspension 50a on a different side from a side continuous with the arm 51, and records and reads out information. If the hard disk device 1 includes a plurality of the hard disks 3, the carriage 5 includes a plurality of the magnetic head portions 50 in accordance with the number of the hard disks 3.

The VCM 6 includes a coil 60 connected to an end on a different side from the arm 51 side, and two magnets 61 that sandwich the coil 60. The VCM 6 drives the carriage 5 by a force generated by the current flowing through the coil 60 and the magnetic field. Consequently, the carriage 5 pivots by the power from the VCM 6 on the center of the pivot axis 7 as the center axis over the surface of the hard disk 3, and causes the magnetic head portion 50 to pivot over the surface of the hard disk 3.

A tolerance ring 8 is used to fix between the carriage 5 and the pivot axis 7. The tolerance ring 8 is housed in the hollow space in the connection portion 52 of the carriage 5 first (see FIGS. 3 and 4, a housing step). The pivot axis 7 is subsequently pressed into the tolerance ring 8 (see FIG. 4, an insertion step) and accordingly the tolerance ring 8 is assembled between the carriage 5 and the pivot axis 7 to fix between the carriage 5 and the pivot axis 7. The carriage 5 is fixed in a pivotable manner on a center axis in a longitudinal direction of the pivot axis 7 being a bearing. The carriage 5 is fixed to the pivot axis 7, which prevents the power of the VCM 6 applied for the pivoting of the carriage 5 to be transferred to the casing body 2.

Figure 5:
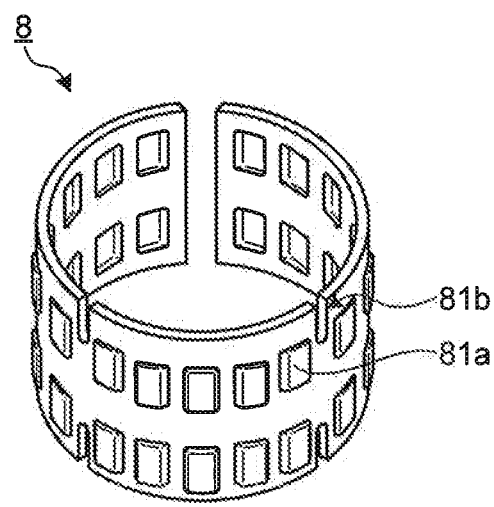
FIG. 5 is a perspective view illustrating the configuration of a tolerance ring of the hard disk device illustrated in FIG. 1.
Figure 6:
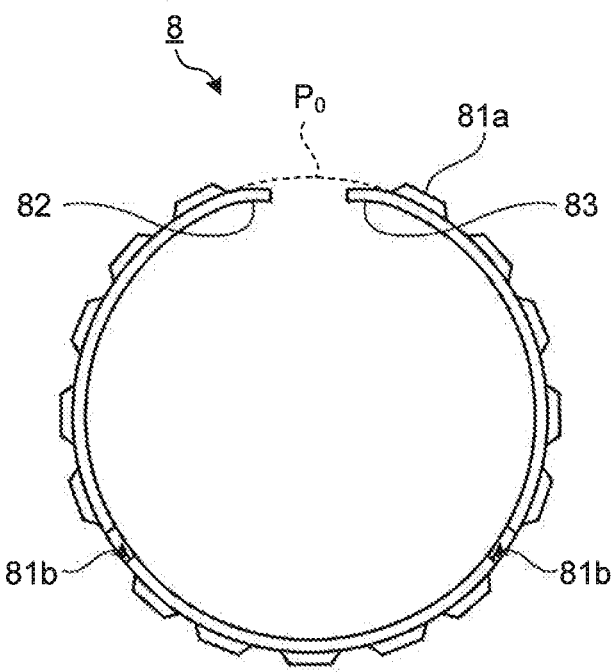
FIG. 6 is a top view illustrating the configuration illustrating the tolerance ring of the hard disk device illustrated in FIG. 1.

FIG. 5 is a perspective view illustrating the configuration of the tolerance ring 8. FIG. 6 is a top view illustrating the configuration of the tolerance ring 8 and is a diagram when viewing the tolerance ring 8 illustrated in FIG. 5 from above. The tolerance ring 8 is formed of plate-shaped stainless, has a substantially ring shape in its circumferential direction, and includes a plurality of convex portions 81a, and notch portions 81b notched on both edges in a direction orthogonal to the circumferential direction (and the thickness direction) as illustrated in FIGS. 5 and 6. The convex portion 81a protrudes, forming a substantially rectangular shape, in the radial direction from an outer surface of the tolerance ring 8. Moreover, two lines of the convex portions 81a are arranged along the circumferential direction of the tolerance ring 8. After the tolerance ring 8 is inserted into an opening of the carriage 5, the pivot axis 7 is pressed into the tolerance ring 8. At this point in time, the convex portions 81a are pressed against an internal wall surface of the connection portion 52 of the carriage 5 to fix between the carriage 5 and the pivot axis 7. It is preferred that the circumferential length of the tolerance ring 8 be equal to the length of the outer circumference of the opening of the connection portion 52. Moreover, the protrusion direction of the convex portion 81a may be one protruding toward the inner periphery side along the radial direction.

Figure 7:
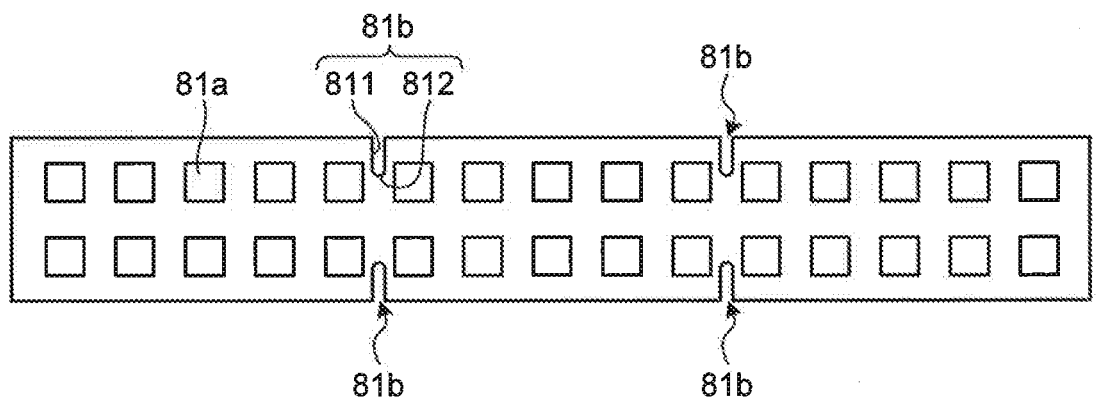
FIG. 7 is a developed view schematically illustrating the configuration of the tolerance ring of the hard disk device illustrated in FIG. 1.
Figure 8:
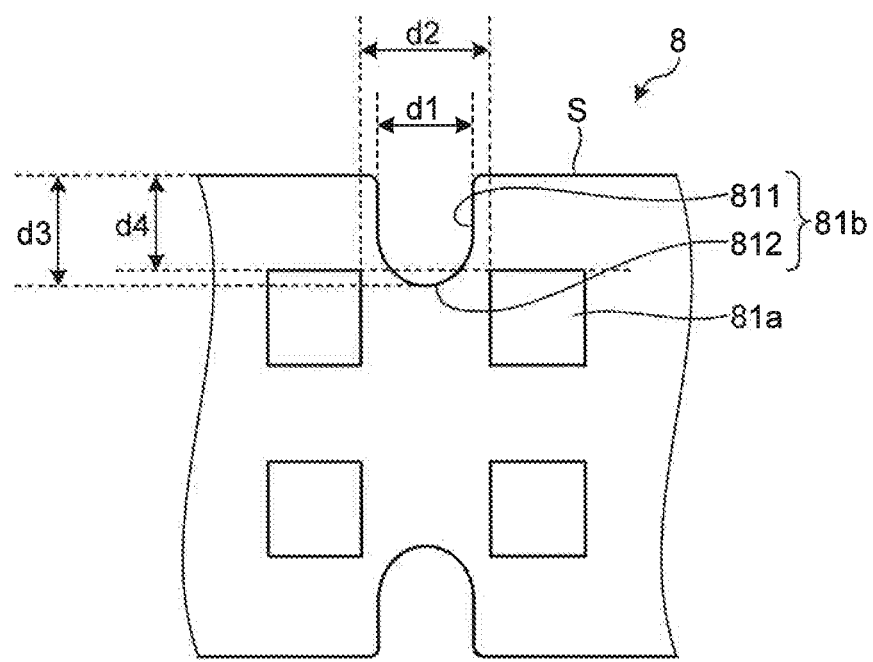
FIG. 8 is a schematic diagram illustrating the configuration of the tolerance ring of the hard disk device illustrated in FIG. 1.

FIG. 7 is a developed view schematically illustrating the configuration of the tolerance ring 8 of the hard disk device 1 illustrated in FIG. 1, and is a diagram in which the tolerance ring 8 is extended in the circumferential direction. FIG. 8 is a schematic diagram illustrating the configuration of the tolerance ring 8 of the hard disk device 1 illustrated in FIG. 1. Both ends of the edge portions in the direction orthogonal to the circumferential direction of the tolerance ring 8 are each provided with two notch portions 81b. The notch portions 81b are formed by being notched on the ends in the direction orthogonal to the circumferential and thickness directions. Moreover, the notch portions 81b are provided at positions that divide a side in the circumferential direction into three equal parts. The notch portion 81b includes an extending portion 811 extending from a proximal end (an end in the direction orthogonal to the circumferential and thickness directions), and a distal end portion 812 that is provided at an end on a different side from the proximal end side of the extending portion 811 and has an arc shape with a predetermined diameter (radius of curvature).

As illustrated in FIG. 8, a distance d1 in the circumferential direction is equal to or less than a distance d2 between the convex portions 81a. It is preferred that the notch portion 81b satisfy the relationship of d1=d2 or d1<d2. Moreover, a distance d3 from the end in the direction orthogonal to the circumferential direction (and the thickness direction) of the tolerance ring 8 to the distal end of the notch portion 81b is equal to or more than a distance d4 from an edge portion S (an outer edge side end portion) in the direction orthogonal to the circumferential and thickness directions of the tolerance ring 8 to an end of the convex portion 81a on the edge portion S side.

When the pivot axis 7 is inserted into the tolerance ring 8 and approaches the convex portions 81a, the diameter of the end of the tolerance ring 8 on the pivot axis 7 insertion side is expanded. Even in such a case, it is possible to prevent the end on the opposite side to the insertion side from floating up following the expansion of the diameter if the above-mentioned relationships between the distances d1 to d4 are satisfied. Consequently, it becomes possible to prevent the carriage 5 from rotating and inclining with respect to the center axis of the pivot axis 7 and being arranged in such a state, and to accurately assemble the drive mechanism.

Moreover, the distal end portion 812 has an arc shape with the predetermined diameter. The diameter (the diameter of curvature) is equal to the width of the extending portion 811 in the circumferential direction (the distance d1). Since the distal end portion 812 of the notch portion 81b has an R shape, the tolerance ring 8 can expand the diameter at the end more flexibly when the pivot axis 7 is inserted into the tolerance ring 8 and approaches the convex portions 81a. Consequently, it is possible to prevent the tolerance ring 8 from being destroyed by the concentration of stress on the end due to the insertion of the pivot axis 7. Moreover, if the length of a notch (the distance d3) is long and if there are a large number of notches, the tolerance ring 8 is likely to be destroyed upon assembly and cleaning. Therefore, it is preferred that the length of the notch portion be short and the number of the notch portions be small within a range that allows the acquisition of the effect.

Moreover, the tolerance ring 8 has different values between the radii of curvature of ends 82 and 83 in the circumferential direction and the radius of curvature of a part other than the ends 82 and 83 in the circumferential direction as in the side view illustrated in FIG. 6. Specifically, the radii of curvature of the ends 82 and 83 in the circumferential direction are equal to the radius of curvature of the connection portion 52 of the carriage 5. Moreover, the radius of curvature of the part other than the ends 82 and 83 in the circumferential direction is larger than the radius of curvature of the connection portion of the carriage 5. In FIG. 6, a broken line $P_0$ represents a circular form of the radius of curvature of the part other than the ends 82 and 83 in the circumferential direction. Consequently, the shape of the tolerance ring 8 along the circumferential direction can be a circle with the radius of curvature substantially equal to the radius of curvature of the connection portion 52 if the open ends 82 and 83 are closed when the tolerance ring 8 is inserted into the connection portion 52 of the carriage 5. The tolerance ring 8 is curved in such a manner as to continuously reduce the radius of curvature from the part other than the ends 82 and 83 toward directions of the ends 82 and 83.

As illustrated also in FIG. 7, a description is given in the embodiment assuming that one line includes 15 convex portions 81a arranged. Two lines of the convex portions 81a of the tolerance ring 8 are arranged along the longitudinal direction of the main surface. It is preferred here for the convex portions 81a that the distances between the adjacent convex portions 81a be equal. The number of the convex portions 81a arranged in one line is a multiple of three to be arranged. The convex portions 81a are arranged in multiples of three. Accordingly, it becomes possible to come into contact with the contact side surface symmetrically at 120°, make the load applied to the side surface of the connection portion 52 substantially uniform, and maintain the operation efficiency of the bearing highly precisely.

Examples of methods for creating the tolerance ring 8 include the following method. This creating method uses a progressive press that sequentially performs the above steps on a parent material extending in a strip shape. Firstly, the press performs an external shape forming process on the parent material extending in a strip shape. The external shape (outer edge) of the tolerance ring 8 is formed to form a base material having the external shape of the tolerance ring 8. A runner maintains the connected state of the base material and the parent material to prevent the base material from being removed from the parent material. Next, the process of forming the convex portions 81a and the notch portions 81b is performed on the formed base material. The convex portions 81a and the notch portions 81b are respectively formed by the press at the above-mentioned positions.

A curving process is performed on the base material where the convex portions 81a and the notch portions 81b have been formed. In the curving step, the base material is curved in stages from both ends along the longitudinal direction of a main surface of the base material in such a manner as to place the convex portions 81a on the outer surface side. The radii of curvature of the ends 82 and 83 in the circumferential direction are formed to be smaller than the radius of curvature of the part other than the ends 82 and 83 in the circumferential direction. It is preferred that the base material be curved in such a manner as to continuously (in multiple stages) reduce the radius of curvature from the part other than the ends 82 and 83 toward the directions of the ends 82 and 83.

After the end of the curving step, a trimming process is performed on the obtained base material. In the trimming process, the base material is cut off from the runner and accordingly the tolerance ring 8 can be obtained. After the trimming process, the process of applying the load of stress equal to or more than the maximum use stress (a presetting process) may be performed on the obtained tolerance ring 8.

According to the embodiment, the notch portions 81b notched in the direction orthogonal to the circumferential direction (and the thickness direction) of the tolerance ring 8 are provided. Accordingly, even if the diameter of the end of the tolerance ring 8 on the pivot axis 7 insertion side is expanded when the pivot axis 7 is inserted into the tolerance ring 8 and approaches the convex portions 81a, it becomes possible to prevent the end on the opposite side to the insertion side from floating up following the expansion of the diameter and suppress the rotation of the carriage with respect to the pivot axis 7. Consequently, the drive mechanism of the hard disk device 1 can accurately be assembled.

Moreover, according to the embodiment, the radii of curvature of the ends 82 and 83 in the circumferential direction is equal to the radius of curvature of the connection portion 52 of the carriage 5, and the radius of curvature of the part other than the ends 82 and 83 in the circumferential direction is larger than the radius of curvature of the connection portion 52 of the carriage 5. Therefore, when being inserted into the connection portion 52 of the carriage 5, the tolerance ring 8 is held in the connection portion 52. In addition, the shape of the tolerance ring 8 in the circumferential direction can he formed into a circle along the wall surface of the connection portion 52. Hence, when being inserted into the connection portion 52 of the carriage 5, the tolerance ring 8 can be inserted without damaging the wall surface of the connection portion 52. Therefore, the occurrence of contamination due to the insertion of the tolerance ring can be suppressed.

Moreover, the conventional tolerance ring can elastically deform its shape along the circumferential direction into a substantially circular shape equal to the opening of the carriage. However, in reality, it is necessary for the tolerance ring to be held in the carriage for the assembling work. Accordingly, the radius of curvature of the tolerance ring is designed to be larger than the radius of curvature of the opening of the carriage. Moreover, in terms of manufacture, the ends of the tolerance ring may be opened to make the radii of curvature of the ends of the tolerance ring larger than the radius of curvature of the opening of the carriage. Consequently, upon the insertion into the opening of the carriage, the elastically deformed tolerance ring is shaped into an ellipse along the circumferential direction. Hence, when the pivot axis or the like is pressed into the tolerance ring, the side surface of the pivot axis comes into contact with the outer edge on the shorter diameter side of the elliptic tolerance ring. Accordingly, the outer edge of the tolerance ring and/or the side surface of the pivot axis may be damaged to trigger the occurrence of contamination.

In contrast, the shape of the tolerance ring 8 according to the embodiment along the circumferential direction has a circular shape along the wall surface of the connection portion 52. Accordingly, when being inserted into the connection portion 52, the tolerance ring 8 can be inserted without damaging the wall surface of the connection portion 52. Moreover, when pivot axis 7 is pressed in, the pivot axis 7 can be pressed in without damaging the inner peripheral surface of the tolerance ring 8 and/or the side surface of the pivot axis 7. Therefore, the occurrence of contamination by the tolerance ring 8 can be suppressed.

As described above, the tolerance ring 8 according to the embodiment can securely fix between the carriage 5 and the pivot axis 7 by the convex portions 81a being pressed against the wall surface of the connection portion 52, in addition to the pivot axis 7 can readily be pressed into the tolerance ring 8.

The description has been given assuming that the shape of the convex portion 81a of the tolerance ring 8 is one protruding from the outer surface in a substantially rectangular shape. However, as long as the above number is satisfied and the shape allows the fixing between members, the outer edge shape in the protrusion direction or the outer edge shape in the protrusion area from the outer surface may be a substantially circular shape. Moreover, the description has been given assuming that the convex portions 81*a* are arranged in two lines along the circumferential direction of the tolerance ring 8. However, the arrangement is not limited to this, but one or a plurality of lines may be provided.

Moreover, the description has been given assuming that the above-mentioned tolerance ring 8 is curved in such a manner as to continuously (in multiple stages) reduce the radius of curvature from the part other than the ends toward the directions of the ends 82 and 83. However, the radii of curvature of the ends and the radius of curvature of the part other than the ends may have two stages for a curve.

Figure 9:
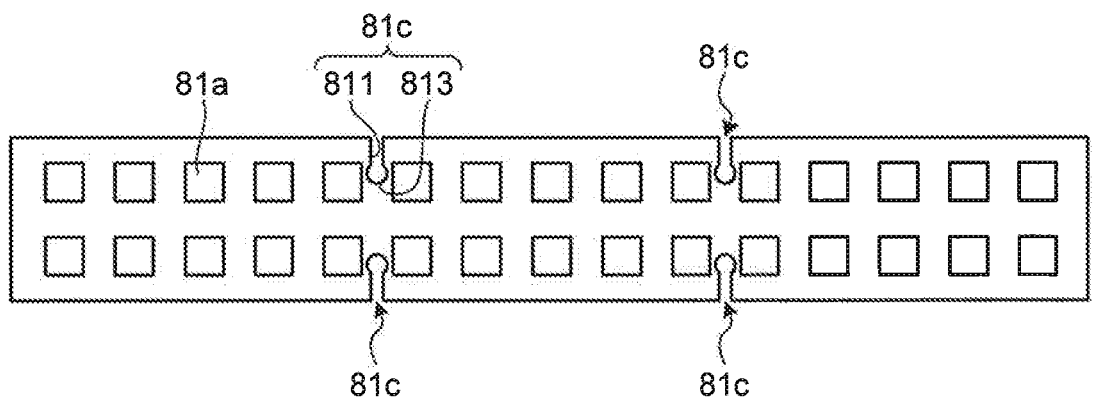
FIG. 9 is a developed view schematically illustrating the configuration of a tolerance ring of a hard disk device according to a first modification of the embodiment of the present invention.

FIG. 9 is a developed view schematically illustrating the configuration of a tolerance ring of a hard disk device according to a first modification of the embodiment, and is a diagram in which the tolerance ring is extended in the circumferential direction. In the above-mentioned embodiment, the description has been given assuming that the diameter of the R shape of the distal end portion 812 is equal to the width of the notch portion 81*b* in the circumferential direction (the distance d1). However, as illustrated in FIG. 9, the notch portion may be a notch portion 81*c* including a distal end portion 813 with a larger diameter than the width in the circumferential direction (corresponding to the distance d1).

Figure 10:
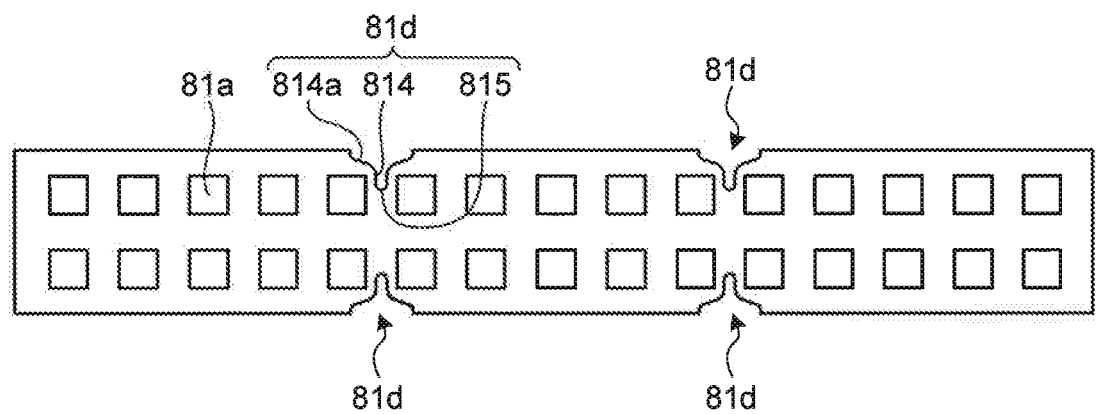
FIG. 10 is a developed view schematically illustrating the configuration of a tolerance ring of a hard disk device according to a second modification of the embodiment of the present invention.

FIG. 10 is a developed view schematically illustrating the configuration of a tolerance ring of a hard disk device according to a second modification of the embodiment, and is a diagram in which the tolerance ring is extended in the circumferential direction. In the above-mentioned embodiment, the description has been given assuming that the extending portion 811 extends in the same width. However, as illustrated in FIG. 10, the notch portion may be a notch portion 81*d* including an extending portion 814 having a reducing diameter portion 814*a* extending from an edge portion with a reducing diameter, and a distal end portion 815 that is provided at an end on a different side from a proximal end side of the extending portion 814 and has an arc shape with a predetermined diameter (radius of curvature). The width of the reducing diameter portion 814*a* on the edge portion side is larger than the distance between the adjacent convex portions 81*a*. The extending portion 814 may have a stepped shape with a plurality of different widths, or a shape with a continuously reducing diameter. Moreover, the width of the reducing diameter portion 814*a* on the edge portion side may be smaller than the distance between the convex portions 81*a* as long as the reducing diameter portion 814*a* has a shape whose diameter is increasingly reduced toward the distal end portion 815.

Figure 11:
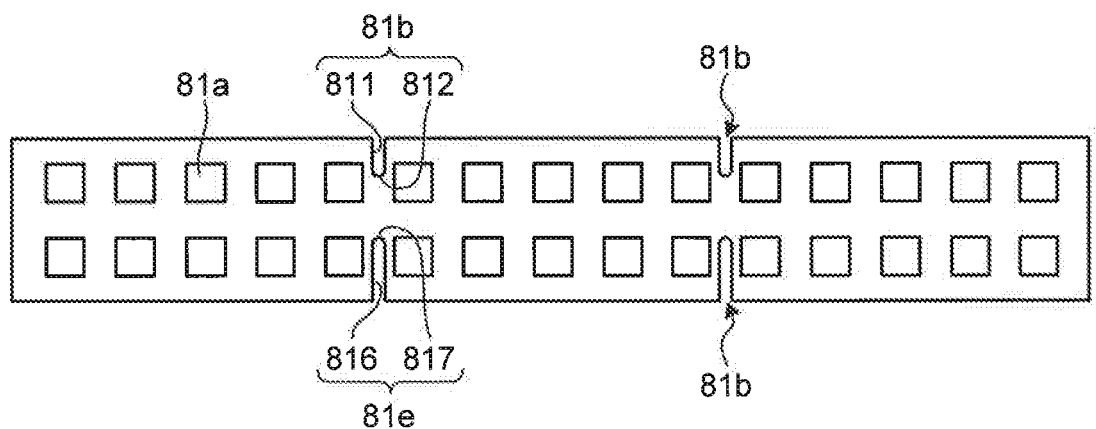
FIG. 11 is a developed view schematically illustrating the configuration of a tolerance ring of a hard disk device according to a third modification of the embodiment of the present invention.

FIG. 11 is a developed view schematically illustrating the configuration of a tolerance ring of a hard disk device according to a third modification of the embodiment, and is a diagram in which the tolerance ring is extended in the circumferential direction. In the above-mentioned embodiment, the description has been given assuming that the extending portions 811 at both ends extend for the same length. However, as illustrated in FIG. 11, a notch portion 81*e* may be provided on one edge portion side, the notch portion 81*e* being different in the length of an extending portion from the notch portion 81*b* provided on the other edge portion side. The notch portion 81*e* includes an extending portion 816 extending from the edge portion longer than the extending portion 811, and a distal end portion 817 that is provided at an end on a different side from the edge portion side of the extending portion 816 and has an arc shape with a predetermined diameter (radius of curvature). Moreover, the diameter of an R shape of the distal end portion 817 may be equal to the width of a side continuous with the distal end portion 817 of the extending portion 816, or may be larger than the width in the circumferential direction.

Figure 12:
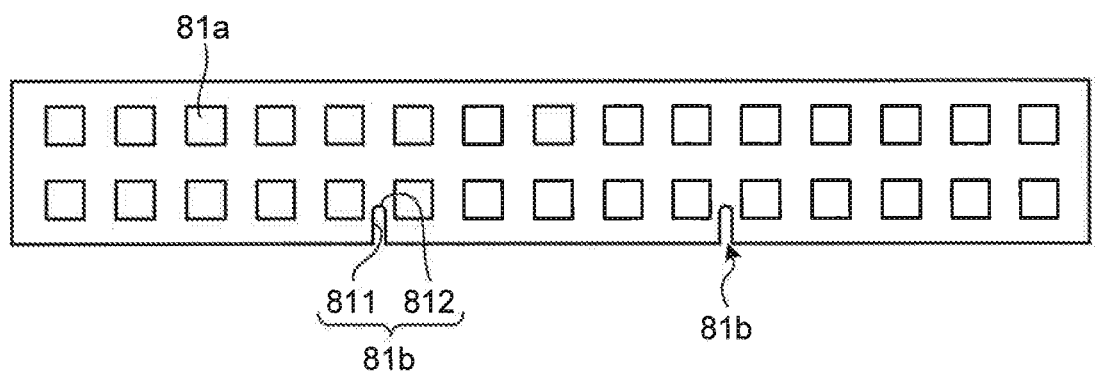
FIG. 12 is a developed view schematically illustrating the configuration of a tolerance ring of a hard disk device according to a fourth modification of the embodiment of the present invention.

FIG. 12 is a developed view schematically illustrating the configuration of a tolerance ring of a hard disk device according to a fourth modification of the embodiment, and is a diagram in which the tolerance ring is extended in the circumferential direction. In the above-mentioned embodiment, the description has been given assuming that the notch portions 81*b* are provided in both edge portions in the direction orthogonal to the circumferential direction at the notch portions 81*b*. However, as illustrated in FIG. 12, the notch portions 81*b* may be provided on one edge portion side. In this case, it is preferred that the edge portion in which the notch portions 91*b* are provided be an end on a different side from the pivot axis 7 insertion side of the tolerance ring 8.

Moreover, as in the tolerance ring according to the fourth modification, if notch portions are provided on one end side, the notch portions are provided at an edge portion on a different side from the pivot axis 7 insertion side of the tolerance ring 8. Accordingly, the effect of suppressing the rotation of the carriage 5 can be enhanced. Specifically, if a notch portion with a length (corresponding to the distance d3) of 1.0 mm in the width direction (the direction orthogonal to the circumferential direction) is formed, the case where the 1.0 mm notch portion is formed at one end (the end on the different side from the pivot axis 7 insertion side) can obtain a larger effect of suppressing the rotation of the carriage 5 than a case where 0.5 mm notch portions are provided at both ends.

Figure 13:
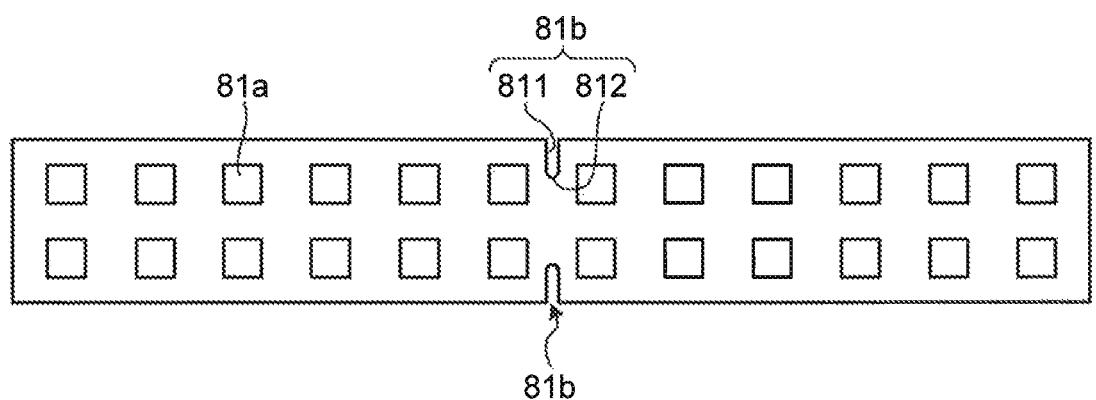
FIG. 13 is a developed view schematically illustrating the configuration of a tolerance ring of a hard disk device according to a fifth modification of the embodiment of the present invention.

FIG. 13 is a developed view schematically illustrating the configuration of a tolerance ring of a hard disk device according to a fifth modification of the embodiment, and is a diagram in which the tolerance ring is extended in the circumferential direction. In the fifth modification, a description is given assuming that there are 12 convex portions 81*a*. In the above-mentioned embodiment, the description has been given assuming that the notch portions 81*b* are provided at positions that divide the side in the circumferential direction into three equal parts. However, as illustrated in FIG. 13, the notch portions 81*b* may be provided at a position that divides a side in the circumferential direction into two equal parts. Moreover, a case is also applicable in which a plurality of (three or more) notch portions is provided at positions that divide the side in the circumferential direction into four or more equal parts. It is preferred that at least one or more notch portions be provided at a position(s) that divide the side in the circumferential direction into equal parts.

EXAMPLE

Figure 14:
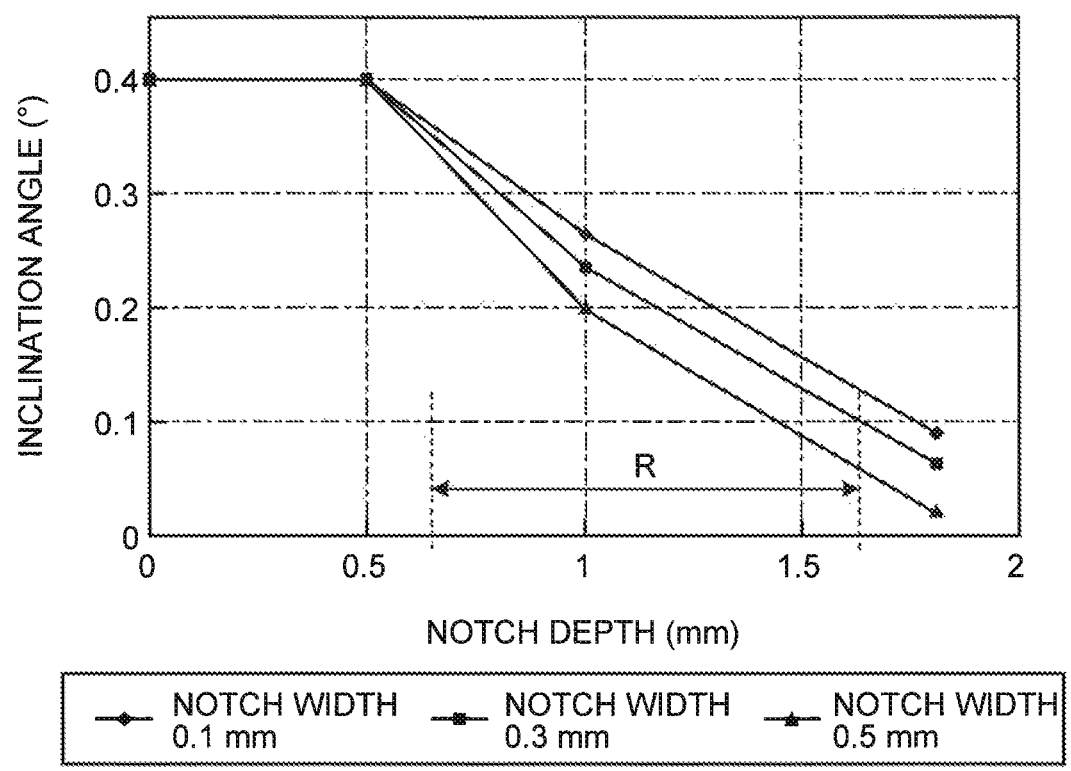
FIG. 14 is a graph illustrating the relationship between the notch depth of a tolerance ring and the inclination angle according to an example of the present invention.
Figure 15:
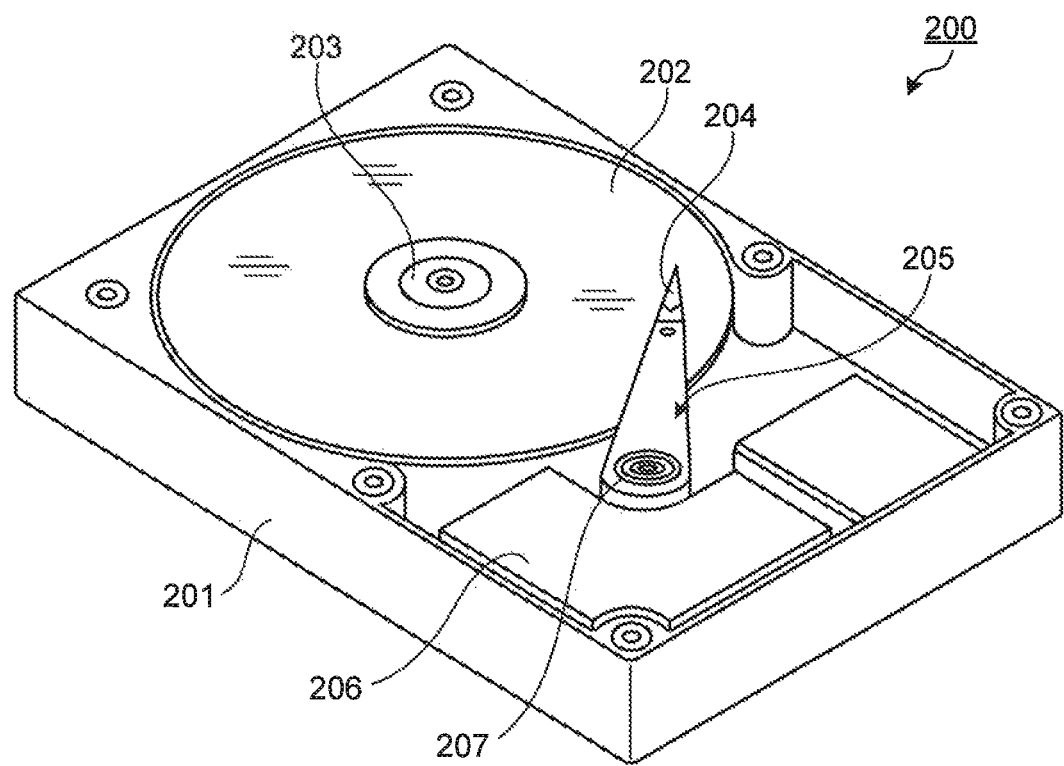
FIG. 15 is a perspective view illustrating a schematic configuration of a conventional hard disk device.
Figure 16:
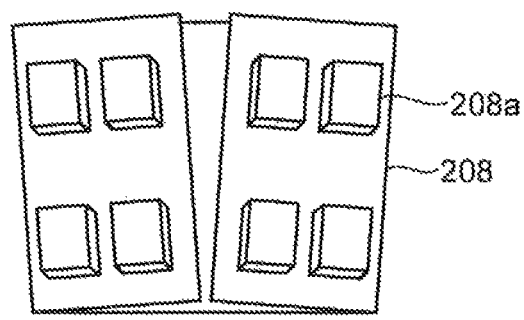
FIG. 16 is a side view illustrating a tolerance ring of the conventional hard disk device.
Figure 17:
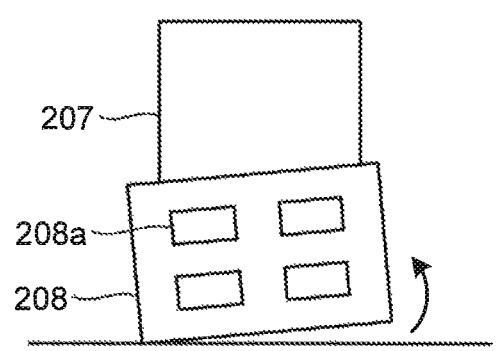
FIG. 17 is a schematic diagram illustrating the configuration of a main part of the conventional hard disk device.
Figure 18:
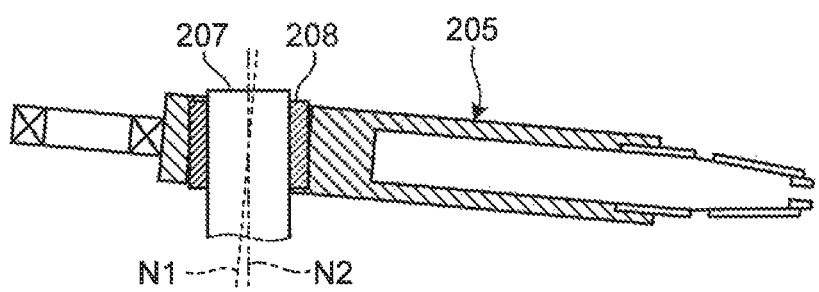
FIG. 18 is a schematic diagram illustrating the configuration of the main part of the conventional hard disk device.

An example of the present invention is described with reference to FIG. 14. The present invention is not limited to the following example. FIG. 14 is a graph illustrating the relationship between the notch depth of a tolerance ring and the inclination angle according to the example. In the example, the depth of the notch portion (corresponding to the distance d3) is referred to as the "notch depth." The graph illustrated in FIG. 14 illustrates the relationship between the notch depth of the notch portion and the inclination angle of the carriage's axis (the center axis of the hollow space of the connection portion 52) with respect to the center axis of the pivot axis. The inclination angle can be obtained from the inclination of the axis of the carriage after the insertion of the pivot axis into the tolerance ring.

In the example, tolerance rings are used which are made of plate-shaped stainless with a length of 400 mm, a width of 25.2 mm, and a thickness of 0.1 mm, and has a substantially ring shape with the horizontal direction (longitudinal direction) as the circumferential direction. Moreover, the tolerance rings according to the example include the convex portions (the convex portions 81a) and notch portions (the notch portions 81b) that are illustrated in FIG. 5 and the like. In the graph of FIG. 14, an area R between broken lines represents an area where the convex portion 81a is formed.

The tolerance rings according to the example having notch portions with distances in the direction orthogonal to the circumferential and thickness directions (notch widths, see the distance d1 of FIG. 8) of 0.1 mm, 0.3 mm, and 0.5 mm, respectively, are used to obtain the inclination angles.

As in the graph illustrated in FIG. 14, if the notch depth is 0.5 mm or more (with increasing closeness to the convex portion formation area), the inclination angle becomes reduced. Moreover, as the notch width becomes larger: 0.1 mm, 0.3 mm, and 0.5 mm, the inclination angle becomes reduced. Consequently, the formation of the notch portion enables the inclination (rotation) of the axis of the tolerance ring with respect to the center axis of the pivot axis to be suppressed. In addition, as the notch depth and the notch width become larger, a larger effect can be obtained.

Industrial Applicability

As described above, the tolerance ring, the hard disk device, and the method for manufacturing a hard disk device according to the present invention are useful in suppressing the rotation of the carriage with respect to the pivot axis when the pivot axis is pressed in and improving the precision of the assembly.

REFERENCE SIGNS LIST 1, 200 Hard disk device
2, 201 Casing body
3, 202 Hard disk
4, 203 Spindle
5, 205 Carriage
6, 206 VCM
7, 207 Pivot axis
8, 208 Tolerance rind
50 Magnetic head portion
50a Suspension
50b, 204 Magnetic head
51 Arm
52 Connection portion
60 Coil
61 Magnet
81a, 208a Convex portion
81b, 81c, 81d, 81e Notch portion
82, 83 End
811, 814, 816 Extending portion
812, 813, 815, 817 Distal end portion

The invention claimed is:

1. A tolerance ring that has a ring shape formed of a plate-shaped member, comprising:
   a plurality of convex portions protruding in a radial direction; and
   a notch portion notched in a direction orthogonal to a circumferential direction on at least one of outer edge side end portions in the direction orthogonal to the circumferential direction and provided between the plurality of convex portions, and a length of the notch portion in the circumferential direction being equal to or less than a distance between the adjacent convex portions, wherein
   the tolerance ring is configured to be housed in a hollow space formed in a carriage of a hard disk device, and the ring shape of the tolerance ring is configured such that a pivot axis of the hard disk device is inserted therein, and
   the notch portion is configured to suppress inclination of an axis of the hollow space formed in the carriage with respect to a center axis of the pivot axis.

2. The tolerance ring according to claim 1, wherein the length of the notch portion in the direction orthogonal to the circumferential direction is equal to or more than a distance between the outer edge side end portion in the direction orthogonal to the circumferential direction and an end of the convex portion on the outer edge side end portion side.

3. The tolerance ring according to claim 1, wherein the notch portion is provided at a position that divides a side in the circumferential direction into equal parts.

4. The tolerance ring according to claim 1, wherein the outer edge side end portion includes one or two notch portions.

5. The tolerance ring according to claim 1, wherein the notch portion includes:
   an extending portion extending from a proximal end; and
   a distal end portion provided at an end on a different side from the proximal end side of the extending portion, the distal end portion having an arc shape with a predetermined diameter.

6. The tolerance ring according to claim 5, wherein the diameter of the distal end portion is equal to or larger than a width of the extending portion in the circumferential direction.

7. The tolerance ring according to claim 1, wherein the radius of curvature of an end in the circumferential direction is smaller than the radius of curvature of a part other than the end in the circumferential direction.

8. The tolerance ring according to claim 7, wherein the radius of curvature continuously becomes smaller from the part other than the end toward a direction of the end.

9. The tolerance ring according to claim 1, wherein
   the plurality of convex portions are arranged along the circumferential direction, and
   among the convex portions arranged along the circumferential direction, the number of the convex portions arranged in one line is a multiple of three.

10. A hard disk device comprising:
    a hard disk being a recording medium;
    a magnetic head that records information in the hard disk and reads out information;
    a carriage that supports the magnetic head and pivots over a surface of the hard disk;
    a tolerance ring that has a ring shape formed of a plate-shaped member and that is housed in a hollow space formed in the carriage, the tolerance ring including:
       a plurality of convex portions protruding in a radial direction; and
       a notch portion notched in a direction orthogonal to a circumferential direction on at least one of outer edge side end portions in the direction orthogonal to the circumferential direction; and
    a pivot axis inserted into the ring shape of the tolerance ring,
    wherein the notch portion is configured to suppress inclination of an axis of the hollow space formed in the carriage with respect to a center axis of the pivot axis.

11. A method for manufacturing a hard disk device comprising:
   housing, in a hollow space formed in a carriage that supports a magnetic head that records information in a hard disk being a recording medium and reads out information and pivots over a surface of the hard disk, a tolerance ring that has a ring shape formed of a plate-shaped member, the tolerance ring including:
      a plurality of convex portions protruding in a radial direction; and
      a notch portion notched in a direction orthogonal to a circumferential direction on at least one of outer edge side end portions in the direction orthogonal to the circumferential direction; and
   inserting a pivot axis into the ring shape of the tolerance ring,
   wherein the notch portion is configured to suppress inclination of an axis of the hollow space formed in the carriage with respect to a center axis of the pivot axis.

12. A tolerance ring that has a ring shape formed of a plate-shaped member, comprising:
   a plurality of convex portions protruding in a radial direction; and
   a notch portion notched in a direction orthogonal to a circumferential direction on at least one of outer edge side end portions in the direction orthogonal to the circumferential direction,
   wherein a radius of curvature of an end in the circumferential direction is smaller than a radius of curvature of a part other than the end in the circumferential direction.

* * * * *